(12) United States Patent
Sato

(10) Patent No.: US 11,402,609 B2
(45) Date of Patent: Aug. 2, 2022

(54) OPTICAL SYSTEM AND IMAGING APPARATUS

(71) Applicant: TAMRON CO., LTD., Saitama (JP)

(72) Inventor: Masaki Sato, Saitama (JP)

(73) Assignee: TAMRON CO., LTD., Saitama (JP)

( * ) Notice: Subject to any disclaimer, the term of this patent is extended or adjusted under 35 U.S.C. 154(b) by 426 days.

(21) Appl. No.: 16/552,431

(22) Filed: Aug. 27, 2019

(65) Prior Publication Data

US 2020/0209598 A1 Jul. 2, 2020

(30) Foreign Application Priority Data

Dec. 27, 2018 (JP) .............................. JP2018-245709

(51) Int. Cl.
| | |
|---|---|
| *G02B 9/34* | (2006.01) |
| *G02B 15/14* | (2006.01) |
| *G02B 13/18* | (2006.01) |
| *G02B 5/20* | (2006.01) |

(52) U.S. Cl.
CPC ................ *G02B 9/34* (2013.01); *G02B 5/208* (2013.01); *G02B 13/18* (2013.01); *G02B 15/1425* (2019.08)

(58) Field of Classification Search
None
See application file for complete search history.

(56) References Cited

U.S. PATENT DOCUMENTS

| 2010/0259632 A1* | 10/2010 | Matsusaka | ........... G02B 13/004 |
| | | | 348/222.1 |
| 2013/0317299 A1* | 11/2013 | Fujii | .................. G02B 23/243 |
| | | | 600/176 |

FOREIGN PATENT DOCUMENTS

| JP | 2007-094032 A | 4/2007 |
| JP | 2017-027001 A | 2/2017 |

* cited by examiner

*Primary Examiner* — Darryl J Collins
(74) *Attorney, Agent, or Firm* — Paratas Law Group, PLLC

(57) ABSTRACT

Provided is an optical system and an imaging apparatus provided with the optical system. The optical system includes: a first lens having negative refractive power; a second lens having negative refractive power; a third lens having positive refractive power; and a fourth lens having positive refractive power, the first lens, the second lens, the third lens, and the fourth lens being disposed in this order from an object side. The optical system satisfies a predetermined condition relating to the focal length of the optical system and the distance on the optical axis between an exit pupil and an imaging plane in the optical system.

11 Claims, 7 Drawing Sheets

OPTICAL SYSTEM AND IMAGING APPARATUS

CROSS-REFERENCE TO RELATED APPLICATIONS

This application is based on and claims the benefit of priority from Japanese Patent Application No. 2018-245709, filed on Dec. 27, 2018, the entire contents of which are incorporated herein by reference.

BACKGROUND OF THE INVENTION

Technical Field

The present invention relates to an optical system having a high imaging performance and an imaging apparatus provided with the optical system.

Related Art

In recent years, with the development of an image automatic identification technique, systems that acquire also information about the periphery of the field of view and perform distance measurement and position detection with high accuracy in the entire area of the field of view have been increasing in demand. These systems often use a method for performing distance measurement and position detection based on the timing of light projection to an object to be measured and the timing of receiving reflected light of the projected light. In this system, in order to improve the accuracy of distance measurement, it is necessary to uniformly and efficiently receive reflected light over the entire area of the field of view. In particular, a bright lens that efficiently receives reflected light also in the peripheral part of the field of view in the same manner as in the center of the field of view is required. Further, since a space for installing and mounting an imaging apparatus is limited, the lens needs to have a wide angle, small size, and light weight.

There has been conventionally proposed, as a lens for the above system, a wide angle lens system in which a negative meniscus first lens L1 and a negative meniscus second lens L2 each of which has a concave surface facing the image side, a positive third lens L3, a stop 4, a positive fourth lens L4 having a convex surface facing the image side, and a band-pass filter 3 are arranged in this order from the object side (e.g., refer to JP 2007-094032 A). This wide angle lens system is capable of performing satisfactory imaging in the near-infrared region while achieving downsizing and weight reduction, and satisfactorily corrects various aberrations including distortion aberration.

As another conventional lens for the above system, there has been proposed an imaging lens including a first lens having negative refractive power, a second lens having negative refractive power, a third lens having positive refractive power, an aperture stop, and a fourth lens having positive refractive power which are disposed in this order from the object side (e.g., refer to JP 2017-027001 A). This wide angle imaging lens has a size mountable on various locations of an automobile or the like, has a high imaging performance throughout the entire screen while securing a wide field of view, and has a high optical performance.

The lens of the conventional technique described above is a fixed focal wide angle lens including four lenses. In the conventional lens, the distance on the optical axis between an exit pupil and the sensor surface of the image sensor is short, and an imaging pencil of light obliquely enters the sensor surface in the peripheral part of the field of view. Thus, a substantial aperture efficiency is reduced, which is disadvantageous in preventing reduction in light quantity in the peripheral part.

OBJECT OF THE INVENTION

The present invention has been made in view of the above problem in the conventional fixed focal wide angle lens, and an object thereof is to provide an optical system that is low in cost, prevents reduction in light quantity in the peripheral part of the field of view although having a wide angle, and has a high imaging performance, and an imaging apparatus provided with the optical system.

SUMMARY OF THE INVENTION

An optical system according to the present invention is an optical system including:
a first lens L1 having negative refractive power; a second lens L2 having negative refractive power; a third lens L3 having positive refractive power; and a fourth lens L4 having positive refractive power, the first lens L1, the second lens L2, the third lens L3, and the fourth lens L4 being disposed in this order from an object side, in which the optical system satisfies the following condition:

$$-0.2 \leq f/EXP \tag{1}$$

where
f is a focal length of the optical system, and
EXP is a distance on an optical axis between an exit pupil and an imaging plane in the optical system when a direction from the object side to the imaging plane is defined as a positive direction.

An imaging apparatus according to the present invention is an imaging apparatus including:
the optical system; and an image sensor configured to convert an optical image formed by the optical system to an electric signal, the image sensor being disposed on the image side of the optical system.

According to the present invention, it is possible to provide a zoom lens capable of achieving high magnification and obtaining high optical performance, and an imaging apparatus provided with the zoom lens.

DESCRIPTION OF THE EMBODIMENTS

Figure 1:
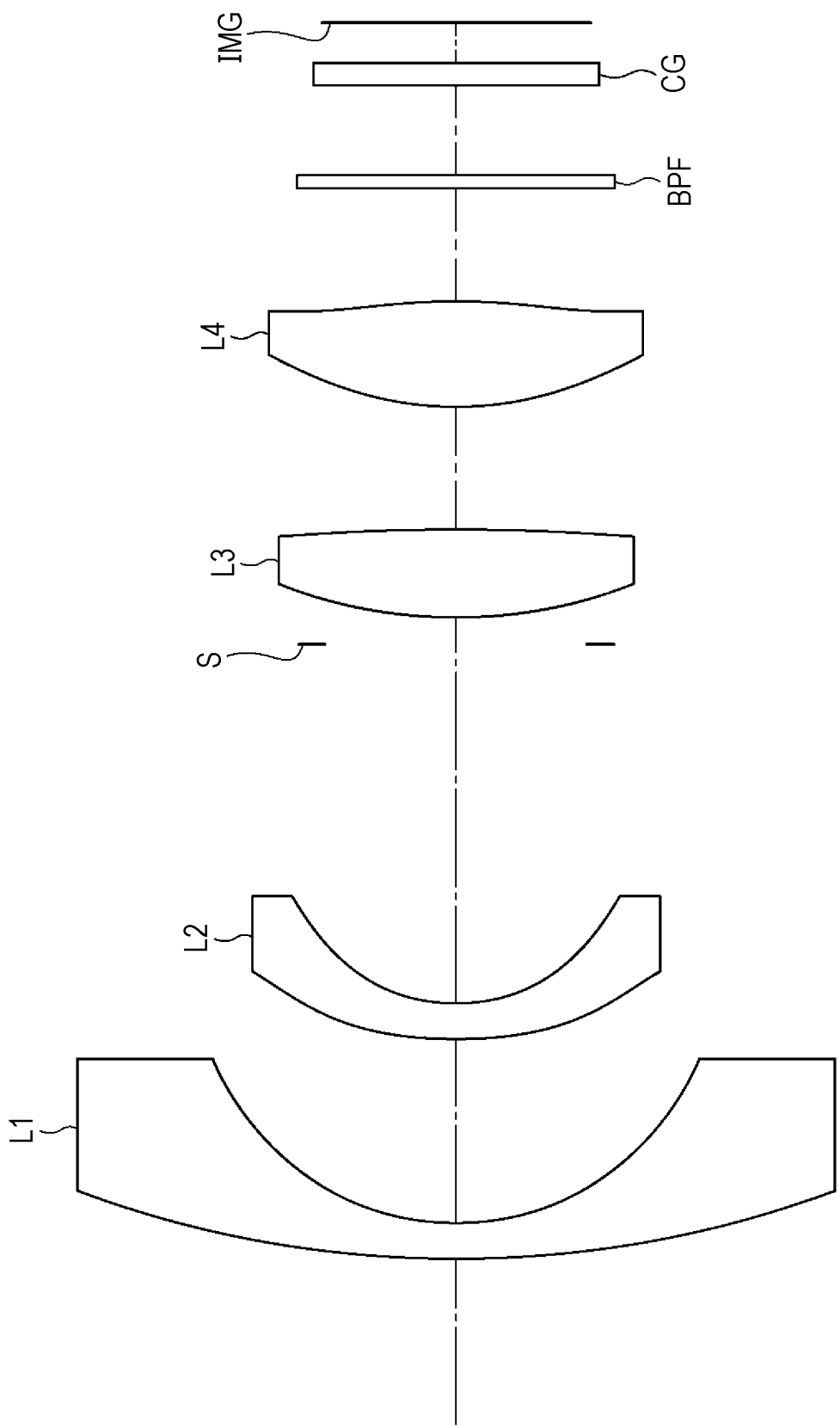
FIG. 1 is a lens configuration diagram of an optical system according to a first example.

An optical system according to the present invention preferably satisfies at least one or more of the following conditional expressions or conditions.

Hereinbelow, a preferred embodiment of the present invention will be described. In the preferred embodiment of the present invention, values of the conditional expressions are based on the d-line.

The optical system according to the present invention includes a first lens L1 having negative refractive power, a second lens L2 having negative refractive power, a third lens L3 having positive refractive power, and a fourth lens L4 having positive refractive power which are disposed in this order from the object side.

A wide angle lens is preferably a retrofocus type lens in which a lens having negative refractive power is disposed on the front side of the optical system, and a lens having positive refractive power is disposed on the rear side thereof. The optical system according to the present invention has a function of gradually changing a large incidence angle of an off-axial principal ray to a small angle along the optical axis by disposing two lenses having negative refractive power, or the first lens L1 having negative refractive power and the second lens L2 having negative refractive power on the front side of the optical system in this order from the object side. Further, the optical system has a function of further reducing the angle between the off-axial principal ray and the optical axis by disposing two lenses having positive refractive power, or the third lens L3 having positive refractive power and the fourth lens L4 having positive refractive power on the rear side of the optical system on the image side of the second lens L2. Accordingly, it is possible to set an exit pupil position away from an imaging plane to secure a sufficient distance on the optical axis between the exit pupil position and the imaging plane in the optical system. As a result, it is possible to make the incidence angle of a ray of light with respect to the imaging plane small to prevent reduction in peripheral light quantity. Further, the refractive power of each lens does not become too strong, and the occurrence of aberration can be reduced by sharing the negative refractive power by the two lenses, or the first lens L1 and the second lens L2 and the positive refractive power by the two lenses, or the third lens L3 and the fourth lens L4. An increase in the number of lenses results in an increase in cost. Thus, the configuration of the present invention makes it possible to achieve an optical system that is low in cost, has a wide angle, and prevents reduction in light quantity in the peripheral part.

Each of the lenses constituting the optical system according to the present invention is more preferably a single lens. That is, lenses are disposed with air spacing therebetween to enable more satisfactory aberration correction.

Further, when each of the first lens L1, the second lens L2, the third lens L3, and the fourth lens L4 is made of a single glass material, low cost and downsizing can be achieved.

The optical system according to the present invention preferably satisfies the following conditional expression (1):

$$-0.2 \leq f/EXP \qquad (1)$$

where f is the focal length of the optical system, and

EXP is the distance on the optical axis between the exit pupil and the imaging plane in the optical system when a direction from the object side to the imaging plane is defined as a positive direction.

The conditional expression (1) is a condition for defining an appropriate exit pupil position.

When the conditional expression (1) is satisfied, it is possible to optimize the exit pupil position to prevent reduction in the peripheral light quantity. When the value of the conditional expression (1) falls below the lower limit, the distance on the optical axis between the exit pupil and the imaging plane in the optical system is reduced, which largely reduces the peripheral light quantity.

Note that EXP denotes the distance on the optical axis between the exit pupil and the imaging plane in the optical system, and the direction from the object side to the imaging plane is defined as the positive direction based on the imaging plane (0). That is, when EXP is negative, the exit pupil is present on the object side relative to the imaging plane. When the EXP is positive, the exit pupil is present on the back side relative to the imaging plane, that is, in the direction separating from the optical system.

The lower limit of the conditional expression (1) is preferably −0.19, and more preferably −0.18. Since reduction in the peripheral light quantity can be prevented by satisfying the lower limit, it is not necessary to set the upper limit. However, a larger value is advantageous in preventing reduction in the peripheral light quantity. However, it is necessary to increase the total length or increase the refractive power of each lens. When the total length is increased, it becomes difficult to downsize the optical system. On the other hand, when the refractive power is increased, it becomes difficult to correct field curvature or coma aberration. Thus, when the upper limit is set, the upper limit is preferably smaller than zero (<0), and more preferably −0.08 or less. Accordingly, it is possible to reduce the diameter of the lens disposed on the rear side of the optical system when the exit pupil position is not made infinite, that is, a telecentric optical system is not formed while keeping the exit pupil position away.

The optical system according to the present invention preferably satisfies the following conditional expression (2):

$$0.5 \leq f1/f2 \leq 1.5 \qquad (2)$$

where f1 is the focal length of the first lens L1, and f2 is the focal length of the second lens L2.

The conditional expression (2) is a condition for appropriately setting the ratio between the focal length of the first lens L1 and the focal length of the second lens L2.

When the conditional expression (2) is satisfied, it is possible to obtain an excellent optical performance while achieving wider angle. When the value of the conditional expression (2) falls below the lower limit, the refractive power of the first lens L1 becomes relatively strong, which makes it easy to secure a sufficient back focus, but makes it difficult to correct astigmatism outside the axis. When the value of the conditional expression (2) exceeds the upper limit, the refractive power of the second lens L2 becomes relatively strong, which makes it difficult to correct coma aberration and field curvature. Further, it becomes difficult to secure a sufficient back focus and difficult to achieve wider angle.

The lower limit of the conditional expression (2) is preferably 0.55, and more preferably 0.60. The upper limit of the conditional expression (2) is preferably 1.20, and more preferably 1.00.

The optical system according to the present invention preferably satisfies the following conditional expression (3):

$$-10.0 \leq f1/f \leq -2.0 \qquad (3)$$

where f1 is the focal length of the first lens L1, and f is the focal length of the optical system.

The conditional expression (3) is a condition for appropriately setting the ratio between the focal length of the first lens L1 and the focal length of the total system.

When the conditional expression (3) is satisfied, it is possible to secure a sufficient back focus while achieving wider angle to correct astigmatism and field curvature in a well-balanced manner while securing a sufficient distance on the optical axis between the exit pupil and the imaging plane. When the value of the conditional expression (3) falls below the lower limit, the negative refractive power of the first lens L1 becomes weak, which makes it difficult to achieve wider angle and also makes it difficult to secure a sufficient back focus. The value of the conditional expression (3) exceeding the upper limit is advantageous in achieving wider angle and securing a sufficient back focus, and makes it easy to set the exit pupil position further away from the imaging plane. However, the negative refractive power of the first lens L1 becomes too strong, which makes it difficult to correct astigmatism and field curvature.

The lower limit of the conditional expression (3) is preferably −8.0, and more preferably −7.0. The upper limit of the conditional expression (3) is preferably −2.5, and more preferably −3.0.

The optical system according to the present invention preferably satisfies the following conditional expression (4):

$$0.0 \leq (R2L+R2R)/(R2L-R2R) \leq 5.0 \quad (4)$$

where

R2L is the paraxial radius of curvature of an object-side lens surface of the second lens L2, and R2R is the paraxial radius of curvature of an image-side lens surface of the second lens L2.

The conditional expression (4) defines the shape of the second lens L2 having negative refractive power.

When the conditional expression (4) is satisfied, it is possible to correct, in particular, coma aberration and astigmatism in a well-balanced manner. When the value of the conditional expression (4) falls below the lower limit, the second lens L2 has a biconcave shape in which the curvature of the object-side lens surface is larger than the curvature of the image-side lens surface. Thus, a diverging action of the object-side lens surface of the second lens L2 becomes too strong, and a diverging action on a ray of light passing through the peripheral side of the lens relative to the principal ray becomes strong. Accordingly, it becomes difficult to correct coma aberration. Further, astigmatism also increases, and field curvature also increases in the positive direction. When the value of the conditional expression (4) exceeds the upper limit, the positive curvature of the object-side lens surface of the second lens L2 becomes too large, which makes it difficult to secure a sufficient negative refractive power as the entire second lens L2. In addition, a converging action of the object-side surface of the second lens L2 on a ray of light passing through the peripheral part of the lens relative to the principal ray becomes strong. Thus, it becomes difficult to correct comma aberration. Further, astigmatism also increases, and field curvature also increases in the negative direction.

The lower limit of the conditional expression (4) is preferably 0.5, and more preferably 1.0. The upper limit of the conditional expression (4) is preferably 4.0, and more preferably 3.8.

The optical system according to the present invention preferably satisfies the following conditional expression (5):

$$2.0 \leq f4/f \leq 6.0 \quad (5)$$

where f4 is the focal length of the fourth lens L4, and f is the focal length of the optical system.

The conditional expression (5) is a condition for appropriately setting the ratio between the focal length of the fourth lens L4 having positive refractive power and the focal length of the total system.

Satisfying the conditional expression (5) is advantageous in setting the exit pupil position away from the imaging plane, and makes it possible to correct astigmatism and coma aberration in a well-balanced manner. When the value of the conditional expression (5) falls below the lower limit, the positive refractive power of the fourth lens L4 becomes too strong. In this case, although the exit pupil position can be set away from the imaging plane, it is difficult to correct astigmatism and coma aberration. When the value of the conditional expression (5) exceeds the upper limit, the positive refractive power of the fourth lens L4 becomes weak, which makes it difficult to secure a sufficient distance on the optical axis between the exit pupil position and the imaging plane and also makes it difficult to correct coma aberration.

The lower limit of the conditional expression (5) is preferably 2.3, and more preferably 2.5. The upper limit of the conditional expression (5) is preferably 5.5, and more preferably 5.0.

The optical system according to the present invention preferably satisfies the following conditional expression (6):

$$1.1 \leq (R1L+R1R)/(R1L-R1R) \leq 4.0 \quad (6)$$

where

R1L is the radius of curvature of an object-side lens surface of the first lens L1, and R1R is the radius of curvature of an image-side lens surface of the first lens L1.

The conditional expression (6) defines the shape of the first lens L1 having negative refractive power. In a wide angle lens, the incidence angle of an off-axial pencil of light with respect to the lens surface is large in the object-side lens, and a large aberration occurs. Thus, when the object-side surface of the first lens L1 has a shape convex to the object side (negative meniscus), the incidence angle of the off-axial ray with respect to the object-side surface of the first lens L1 can be kept small, which enables the occurrence of aberration to be reduced.

When the conditional expression (6) is satisfied, it is possible to correct, in particular, astigmatism and field curvature in a well-balanced manner. When the value of the conditional expression (6) falls below the lower limit, the first lens L1 has a meniscus shape in which the object-side lens surface is close to a plane and the negative curvature of the image-side lens surface is large. Thus, the incidence angle of the off-axial pencil of light with respect to the object-side lens surface of the first lens L1 becomes large, which is disadvantageous in achieving wider angle. Further, the diverging action of the image-side lens surface of the first lens L1 becomes too strong, which increases astigmatism and also increases the field curvature in the positive direction. When the value of the conditional expression (6) exceeds the upper limit, the positive curvature of the object-side lens surface of the first lens L1 becomes too large, which makes it difficult to secure a sufficient negative refractive power as the entire first lens L1. Thus, it becomes difficult to achieve wider angle. Further, astigmatism increases, and field curvature also increases in the negative direction.

The lower limit of the conditional expression (6) is preferably 1.2, and more preferably 1.3. The upper limit of the conditional expression (6) is preferably 3.8, and more preferably 3.6.

The optical system according to the present invention preferably satisfies the following conditional expression (7):

$$0.05 \leq f/R3L \leq 0.4 \qquad (7)$$

where

R3L is the radius of curvature of an object-side lens surface of the third lens L3, and f is the focal length of the optical system.

The conditional expression (7) is a condition for appropriately setting the radio between the focal length of the optical system and the radius of curvature of the object-side lens surface of the third lens L3.

The object-side lens surface of the third lens L3 is preferably convex to the object side. When the conditional expression (7) is satisfied, it is possible to correct, in particular, spherical aberration and coma aberration in a well-balanced manner. When the value of the conditional expression (7) falls below the lower limit, the radius of curvature of the object-side lens surface of the third lens L3 becomes large, which makes it difficult to correct coma aberration and increases spherical aberration in the positive direction. When the value of the conditional expression (7) exceeds the upper limit, the radius of curvature of the object-side lens surface of the third lens L3 becomes small, which makes it difficult to correct coma aberration and increases spherical aberration in the negative direction.

The lower limit of the conditional expression (7) is preferably 0.08, and more preferably 0.10. The upper limit of the conditional expression (7) is preferably 0.38, and more preferably 0.36.

The optical system according to the present invention preferably satisfies the following conditional expression (8):

$$0.03 \leq f/R4L \leq 0.5 \qquad (8)$$

where

R4L is the radius of curvature of an object-side lens surface of the fourth lens L4, and f is the focal length of the optical system.

The conditional expression (8) is a condition for appropriately setting the radio between the focal length of the optical system and the radius of curvature of the object-side lens surface of the fourth lens L4.

The object-side lens surface of the fourth lens L4 is preferably convex to the object side. When the conditional expression (8) is satisfied, it is possible to correct, in particular, coma aberration in a well-balanced manner. When the value of the conditional expression (8) falls below the lower limit, the radius of curvature of the object-side lens surface of the fourth lens L4 becomes large, which weakens a converging action of a ray of light passing through the peripheral side of the lens relative to the principal ray. Thus, it becomes difficult to correct coma aberration. When the value of the conditional expression (8) exceeds the upper limit, the radius of curvature of the object-side lens surface of the fourth lens L4 becomes small, which strengthens the converging action of the ray of light passing through the peripheral side of the lens relative to the principal ray. Thus, it becomes difficult to correct coma aberration.

The lower limit of the conditional expression (8) is preferably 0.10, and more preferably 0.15. The upper limit of the conditional expression (8) is preferably 0.45, and more preferably 0.40.

The optical system according to the present invention preferably includes a stop between the second lens L2 and the third lens L3.

Disposing the stop between the second lens L2 and the third lens L3 is advantageous in setting the exit pupil position away from the imaging plane, and facilitates the securing of the peripheral light quantity.

The optical system according to the present invention preferably includes at least one resin lens.

Using the resin lens enables cost reduction. Further, it is possible to effectively correct aberration while reducing cost by using a resin lens having an aspherical surface. The second lens L2 having negative refractive power and the fourth lens L4 having positive refractive power are preferably resin lenses. When the second lens L2 and the fourth lens L4 are resin lenses, it is possible to reduce focal length fluctuations caused by temperature changes.

The optical system according to the present invention preferably includes a band-pass filter BPF which selects and transmits light in a specific wavelength range.

The band-pass filter BPF enables aberration correction with a small number of lenses and achieves a small and simple configuration. Further, the band-pass filter BPF is preferably disposed on the imaging plane side relative to the third lens L3. This makes it possible to reduce variations in the incidence angle of light even with a wide angle lens and reduce variations in the transmissivity characteristic caused by angle changes in a ray of light incident on the band-pass filter BPF.

More preferably, the band-pass filter BPF is disposed between the fourth lens L4 and the imaging plane.

When the band-pass filter BPF is disposed between the fourth lens L4 and the imaging plane, it is possible to further reduce variations in the angle of a ray of light incident on the band-pass filter BPF. Thus, such a disposition is advantageous in reducing variations in the transmissivity characteristic of the band-pass filter BPF, and is thus preferred.

In the optical system according to the present invention, the refractive index of any one of the lenses at the d-line is preferably 1.85 or higher.

Aberration correction can be satisfactorily performed with a small number of lenses by using a glass material having a high refractive index. More preferably, the refractive index of any one of the lenses at the d-line is 1.88 or higher.

An imaging apparatus according to the present invention includes the optical system according to the present invention, and an image sensor which is disposed on the image side of the optical system and electrically converts an optical image formed by the optical system to an electric signal. Examples of the image sensor include a CMOS-TOF distance image sensor.

In the image sensor of the imaging apparatus according to the present invention, an imaging pencil of light substantially perpendicularly enters an acceptance surface not only on the center of the field of view, but also in the peripheral part of the field of view. Thus, it is possible to prevent reduction in photoelectric conversion efficiency in the peripheral part of the field of view to achieve high imaging performance.

Examples

Hereinbelow, the optical system according to the present invention and the imaging apparatus provided with the optical system will be described with reference to numerical value examples and the accompanying drawings.

The numerical value examples to which specific numerical values of the optical system according to the present invention are applied will be described. In each table, f is the focal length of the total system, Fno is the F number, ω is the half angle of view, r is the radius of curvature, d is the lens thickness or lens interval, Nd is the refractive index at the d-line, vd is the Abbe number at the d-line, ASP affixed to the surface number indicates that the surface is an aspherical surface, and STOP indicates that an aperture stop is disposed. Further, each aspherical shape is represented by the following aspherical expression, where H is a height perpendicular to the optical axis, X(H) is a displaced amount in the optical axis direction at the height H when the surface vertex is an origin, R is the paraxial radius of curvature, k is a constant of the cone, and A, B, C, D, E are a 2nd order aspherical coefficient, a 4th order aspherical coefficient, a 6th order aspherical coefficient, an 8th order aspherical coefficient, and a 10th order aspherical coefficient, respectively.

Aspherical Expression $$X(H) = \frac{H^2/R}{1+\sqrt{1-(1+k)(H^2/R^2)}} + AH^2 + BH^4 + CH^6 + DH^8 + EH^{10}$$

Figure 2:
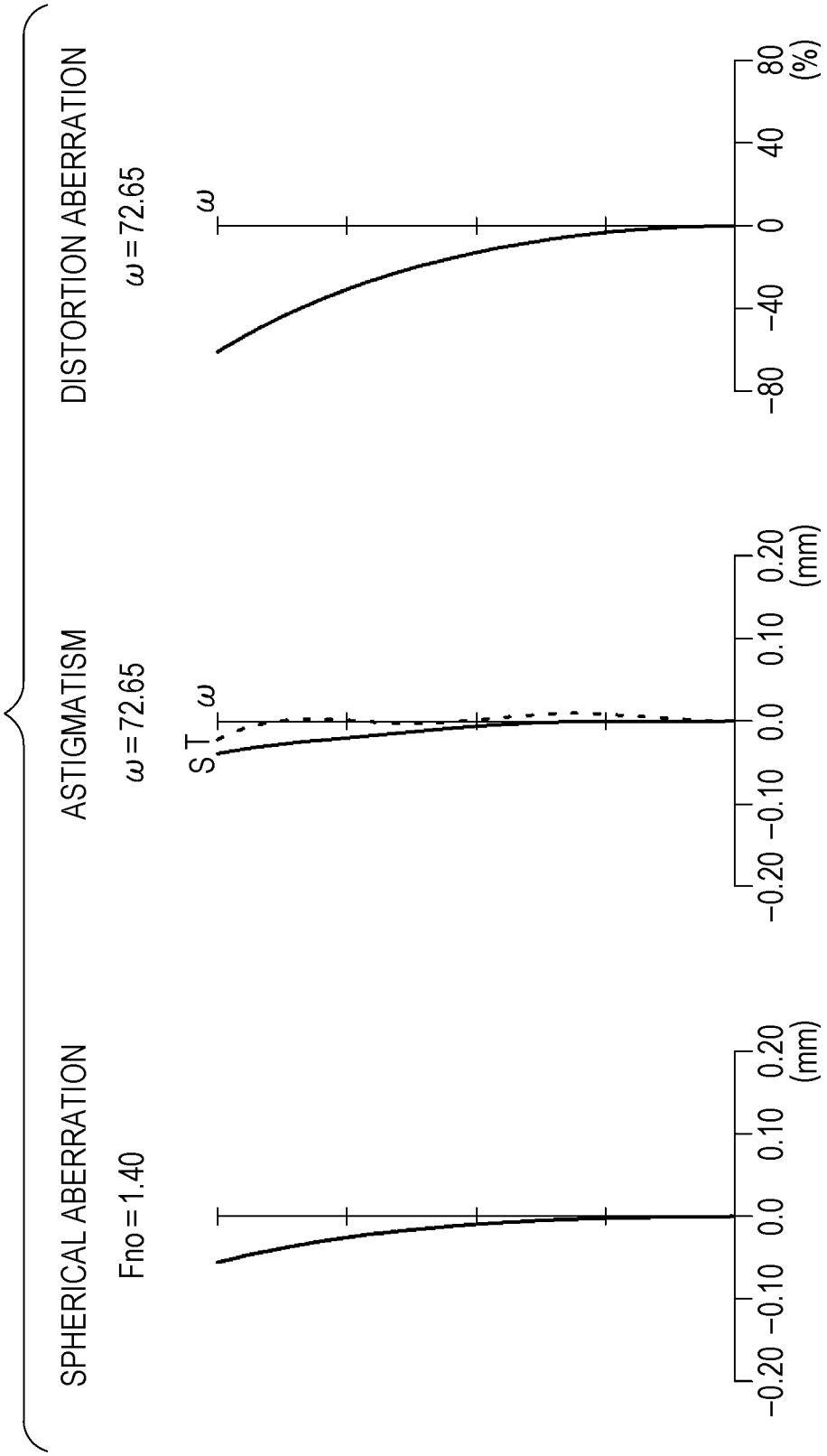
FIG. 2 is a longitudinal aberration diagram of the optical system according to the first example of the present invention in a wavelength of 587.6 nm.
Figure 3:
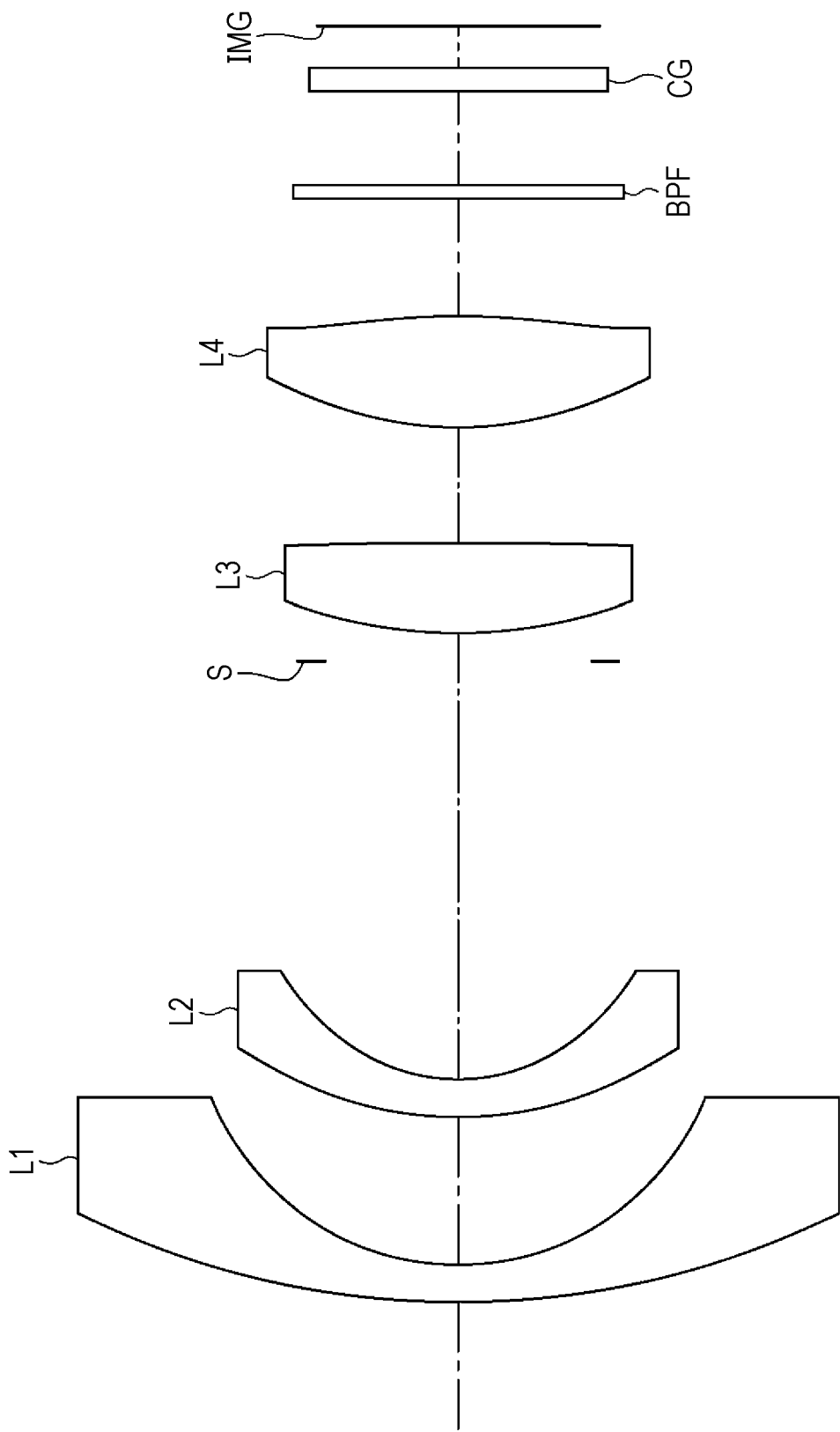
FIG. 3 is a lens configuration diagram of an optical system according to a second example.
Figure 4:
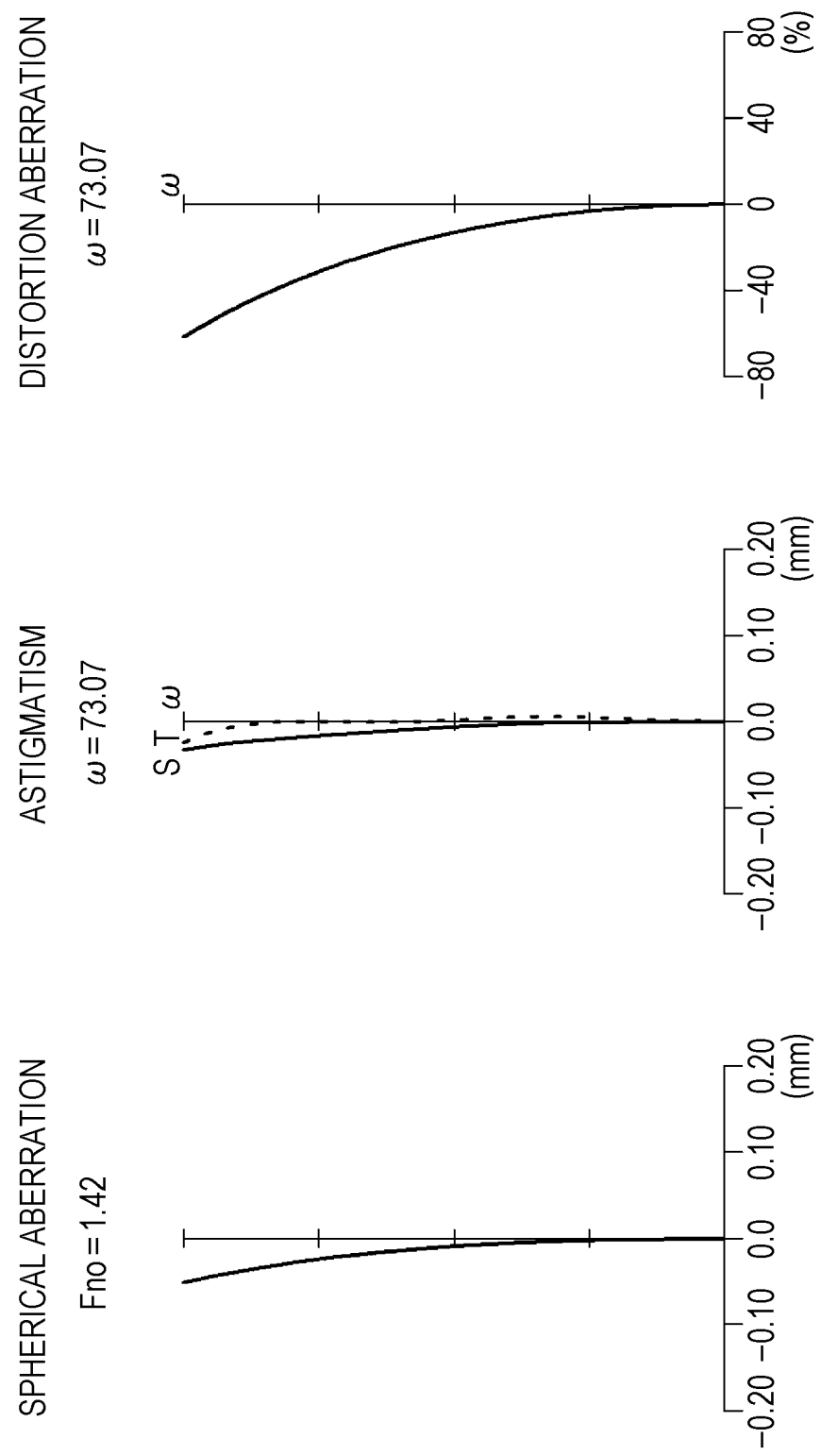
FIG. 4 is a longitudinal aberration diagram of the optical system according to the second example of the present invention in a wavelength of 587.6 nm.
Figure 5:
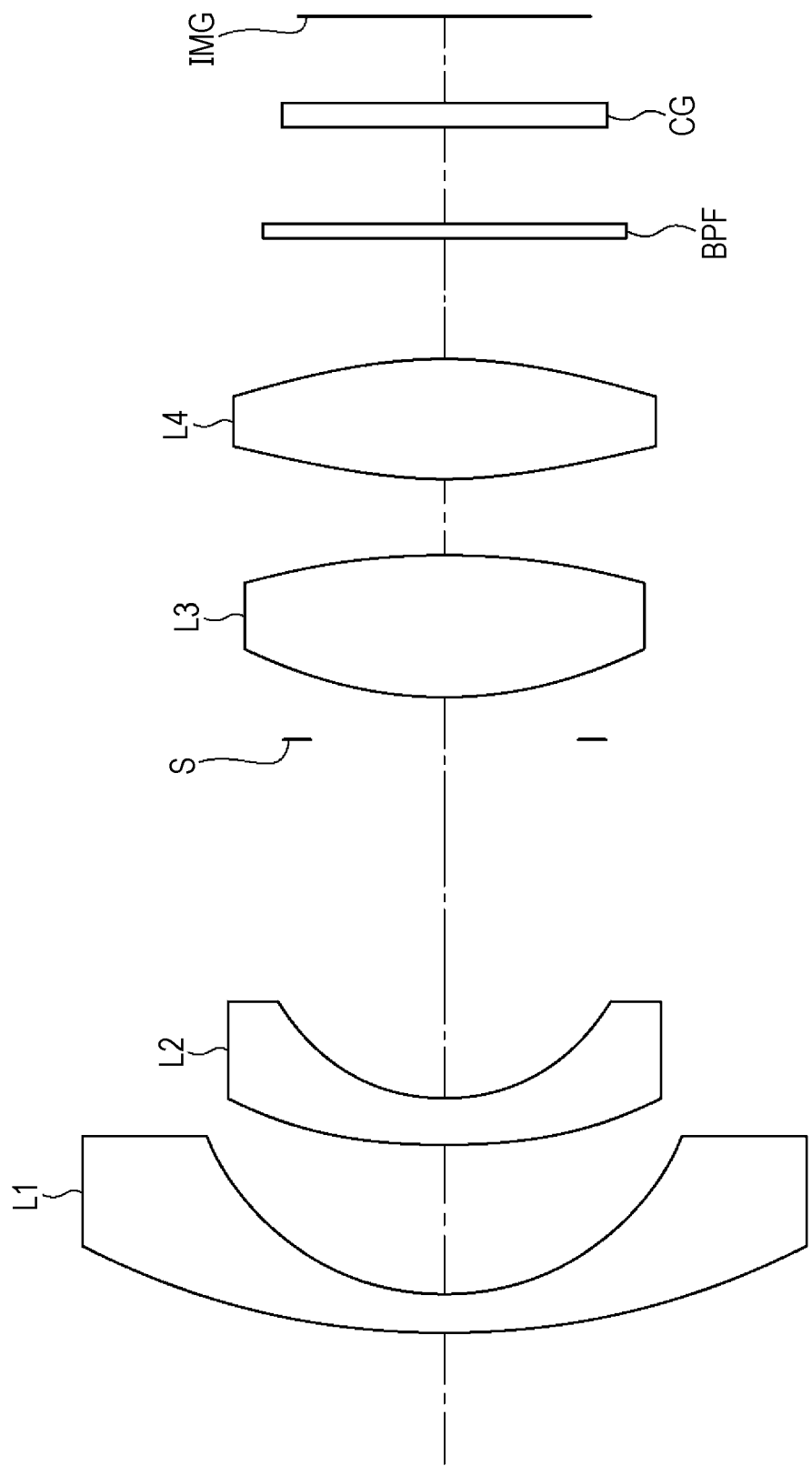
FIG. 5 is a lens configuration diagram of an optical system according to a third example.
Figure 6:
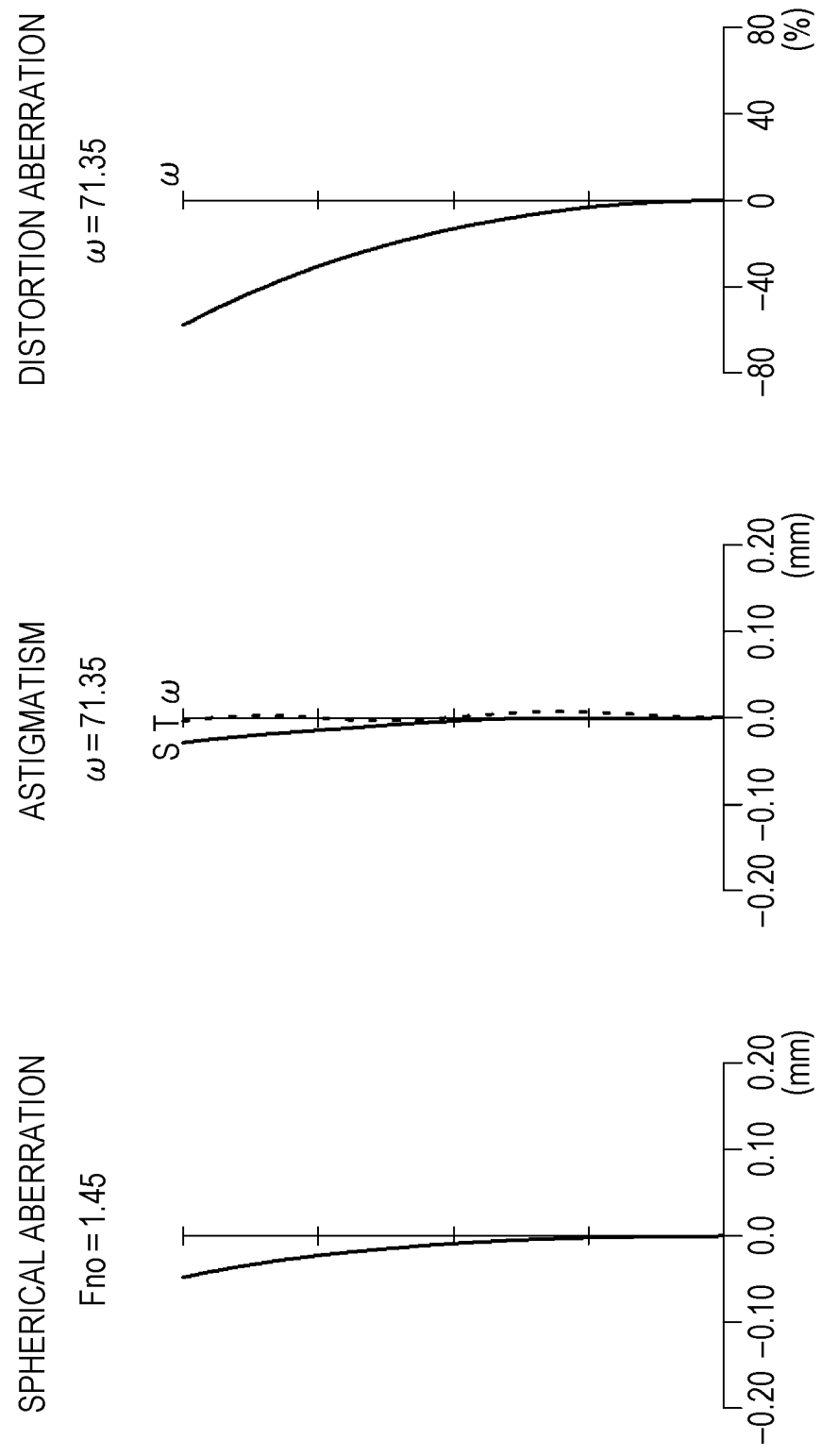
FIG. 6 is a longitudinal aberration diagram of the optical system according to the third example of the present invention in a wavelength of 587.6 nm.

Longitudinal aberration diagrams (FIGS. 2, 4, and 6) of the respective examples show spherical aberration (SA (mm)), astigmatism (AST (mm)), and distortion aberration (DIS (%)) in this order from the left side. In the spherical aberration diagram, the vertical axis represents the F number (indicated by Fno in the drawing), which is a characteristic of the d-line. In the astigmatism diagram, the vertical axis represents the angle of view (indicated by ω in the drawing), and a solid line indicates a characteristic of a sagittal plane (indicated by S in the drawing), and a broken line indicates a characteristic of a meridional plane (indicated by T in the drawing). In the distortion aberration diagram, the vertical axis represents the half angle of view (indicated by ω in the drawing).

First Example

An optical system according to a first example includes a first lens L1 which has negative refractive power and has a meniscus shape convex to the object side, a second lens L2 which has negative refractive power, has meniscus shape convex to the object side, and has an aspherical shape on both faces thereof, a third lens L3 which has positive refractive power and has a biconvex shape, and a fourth lens L4 which has positive refractive power, has a biconvex shape, and has an aspherical shape on both faces thereof, the first lens L1, the second lens L2, the third lens L3, and the fourth lens L4 being disposed in this order from the object side. An aperture stop S is disposed between the second lens L2 and the third lens L3. A band-pass filter BPF is disposed between the fourth lens L4 and an imaging plane IMG. Further, the second lens L2 and the fourth lens L4 are resin lenses.

Although the band-pass filter BPF is disposed between the fourth lens L4 and the imaging plane IMG, the band-pass filter BPF may be disposed between the third lens L3 and the fourth lens L4. The optical system according to the first example is optimized in a near infrared region having a central wavelength of 850 nm and a wavelength range of ±50 nm. However, aberration is corrected also at the central wavelength of 587.6 nm (d-line).

Table 1 shows a specification table of the first example. Various numerical values at the d-line (587.6 nm) are shown. Values at 850 nm are also shown as reference values.

TABLE 1

SPECIFICATION TABLE

|  | BASED ON d-LINE | * BASED ON 850 nm |
|---|---|---|
| f | 2.41 | 2.49 |
| Fno | 1.40 | 1.40 |
| ω | 72.65 | 69.62 |

TABLE 2

LENS DATA

| SURFACE NUMBER | r | d | Nd | vd |
|---|---|---|---|---|
| 1 | 24.579 | 0.800 | 1.8343 | 37.20 |
| 2 | 5.908 | 4.080 | | |
| 3 ASP | 12.454 | 0.800 | 1.5350 | 55.63 |
| 4 ASP | 4.567 | 7.979 | | |
| 5 STOP | INF | 0.600 | | |
| 6 | 10.851 | 1.944 | 1.9108 | 35.30 |
| 7 | −49.982 | 2.741 | | |
| 8 ASP | 7.618 | 2.343 | 1.5350 | 55.63 |
| 9 ASP | −13.651 | 2.500 | | |
| 10 | INF | 0.300 | 1.5163 | 64.15 |
| 11 | INF | 2.000 | | |
| 12 | INF | 0.500 | 1.5163 | 64.15 |
| 13 | INF | 0.686 | | |

TABLE 3

ASPHERICAL DATA (UNSHOWN ASPHERICAL COEFFICIENT IS 0.00000)

| No. | K | B | C | D | E |
|---|---|---|---|---|---|
| 3 | −6.36471E+00 | 4.49955E−03 | −2.03570E−04 | 4.49939E−06 | −4.49026E−08 |
| 4 | −8.27621E−01 | 6.35458E−03 | −1.20708E−04 | −2.42510E−06 | 1.62599E−07 |
| 8 | 5.82019E−01 | −5.24399E−04 | 1.02789E−06 | 6.23788E−07 | −5.40451E−08 |
| 9 | −3.40325E+00 | 1.31530E−03 | −2.65716E−07 | 5.84901E−07 | −3.79953E−08 |

Second Example

An optical system according to a second example includes a front lens group including a first lens L1 which has negative refractive power and has a meniscus shape convex to the object side and a second lens L2 which has negative refractive power, has a meniscus shape convex to the object side, and has an aspherical shape on both faces thereof, and a rear lens group including a third lens L3 which has positive refractive power and has a biconvex shape and a fourth lens L4 which has positive refractive power, has a biconvex shape, and has an aspherical shape on both faces thereof, the first lens L1, the second lens L2, the third lens L3, and the fourth lens L4 being disposed in this order from the object side. An aperture stop S is disposed between the second lens L2 and the third lens L3. A band-pass filter BPF is disposed between the fourth lens L4 and an imaging plane IMG. Further, the second lens L2 and the fourth lens L4 are resin lenses.

Although the band-pass filter BPF is disposed between the fourth lens L4 and the imaging plane IMG, the band-pass filter BPF may be disposed between the third lens L3 and the fourth lens L4. The optical system according to the second example is optimized in the near infrared region having a central wavelength of 850 nm and a wavelength range of ±50 nm. However, aberration is corrected also at the central wavelength of 587.6 nm (d-line).

Table 4 shows a specification table of the second example. Various numerical values at the d-line (587.6 nm) are shown. Values at 850 nm are also shown as reference values.

TABLE 4

SPECIFICATION TABLE

|  | BASED ON d-LINE | * BASED ON 850 nm |
|---|---|---|
| f | 2.38 | 2.47 |
| Fno | 1.42 | 1.42 |
| ω | 73.07 | 69.90 |

TABLE 5

LENS DATA

| SURFACE NUMBER | r | d | Nd | vd |
|---|---|---|---|---|
| 1 | 18.213 | 0.800 | 1.9109 | 35.20 |
| 2 | 5.656 | 3.153 | | |
| 3 ASP | 10.382 | 0.800 | 1.6172 | 25.00 |
| 4 ASP | 4.495 | 8.937 | | |
| 5 STOP | INF | 0.600 | | |
| 6 | 10.312 | 1.916 | 1.9109 | 35.20 |
| 7 | −119.476 | 2.463 | | |
| 8 ASP | 7.476 | 2.385 | 1.5350 | 55.63 |
| 9 ASP | −14.003 | 2.500 | | |
| 10 | INF | 0.300 | 1.5163 | 64.15 |
| 11 | INF | 2.000 | | |
| 12 | INF | 0.500 | 1.5163 | 64.15 |
| 13 | INF | 0.895 | | |

TABLE 6

ASPHERICAL DATA (UNSHOWN ASPHERICAL COEFFICIENT IS 0.00000)

| No. | K | B | C | D | E |
|---|---|---|---|---|---|
| 3 | −6.13628E+00 | 3.55948E−03 | −1.57445E−04 | 2.70385E−06 | −1.41667E−08 |
| 4 | −1.50056E+00 | 5.72369E−03 | −8.99683E−05 | −5.54533E−06 | 2.76795E−07 |
| 8 | 2.97397E−01 | −5.41806E−04 | 3.01951E−07 | 3.88254E−07 | −3.56819E−08 |
| 9 | −7.46456E−01 | 1.30352E−03 | −4.45592E−06 | 4.03728E−07 | −2.19383E−08 |

Third Example

An optical system according to a third example includes a front lens group including a first lens L1 which has negative refractive power and has a meniscus shape convex to the object side and a second lens L2 which has negative refractive power, has a meniscus shape convex to the object side, and has an aspherical shape on both faces thereof, and a rear lens group including a third lens L3 which has positive refractive power and has a biconvex shape and a fourth lens L4 which has positive refractive power, has a biconvex shape, and has an aspherical shape on both faces thereof, the first lens L1, the second lens L2, the third lens L3, and the fourth lens L4 being disposed in this order from the object side. An aperture stop S is disposed between the second lens L2 and the third lens L3. A band-pass filter BPF is disposed between the fourth lens L4 and an imaging plane IMG. Further, the second lens L2, the third lens L3, and the fourth lens L4 are resin lenses.

Although the band-pass filter BPF is disposed between the fourth lens L4 and the imaging plane IMG, the band-pass filter BPF may be disposed between the third lens L3 and the fourth lens L4.

The optical system according to the third example is optimized in the near infrared region having a central wavelength of 850 nm and a wavelength range of ±50 nm. However, aberration is corrected also at the central wavelength of 587.6 nm (d-line).

Table 7 shows a specification table of the optical system according to the third example. Various numerical values at the d-line (587.6 nm) are shown. Values at 850 nm are also shown as reference value.

TABLE 7

SPECIFICATION TABLE

|  | BASED ON d-LTNE | * BASED ON 850 nm |
|---|---|---|
| f | 2.41 | 2.49 |
| Fno | 1.45 | 1.45 |
| ω | 71.35 | 68.80 |

TABLE 8

LENS DATA

| SURFACE NUMBER | r | d | Nd | vd |
|---|---|---|---|---|
| 1 | 16.469 | 0.8000 | 1.9109 | 35.20 |
| 2 | 5.295 | 2.6887 | | |
| 3 ASP | 17.500 | 0.9756 | 1.5350 | 55.63 |
| 4 ASP | 4.389 | 7.9059 | | |
| 5 STOP | INF | 0.7189 | | |
| 6 ASP | 8.442 | 2.5904 | 1.5350 | 55.63 |
| 7 ASP | −16.684 | 2.0205 | | |
| 8 ASP | 9.468 | 2.5000 | 1.5350 | 55.63 |
| 9 ASP | −10.381 | 2.5000 | | |

TABLE 8-continued

LENS DATA

| SURFACE NUMBER | r | d | Nd | vd |
|---|---|---|---|---|
| 10 | INF | 0.3000 | 1.5163 | 64.15 |
| 11 | INF | 2.0000 | | |
| 12 | INF | 0.5000 | 1.5163 | 64.15 |
| 13 | INF | 1.8000 | | |

TABLE 9

| ASPHERICAL DATA (UNSHOWN ASPHERICAL COEFFICIENT IS 0.00000) | | | | | |
|---|---|---|---|---|---|
| No. | K | B | C | D | E |
| 3 | −7.69079E−01 | 2.70705E−03 | −1.60653E−04 | 5.37853E−06 | −8.15435E−08 |
| 4 | −1.71633E+00 | 6.40322E−03 | −1.66872E−04 | 8.18927E−06 | −8.16843E−09 |
| 6 | −8.39844E−01 | −1.85333E−04 | 8.59034E−06 | −5.56907E−08 | 0.00000E+00 |
| 7 | 7.31789E+00 | −4.46747E−04 | 3.81024E−05 | −3.80322E−07 | 0.00000E+00 |
| 8 | −3.70256E+00 | −7.59605E−04 | 4.68472E−06 | 3.51524E−07 | −4.72965E−09 |
| 9 | 1.20079E+00 | 6.28101E−04 | −1.38486E−05 | 7.14766E−07 | 5.23355E−09 |

(Imaging Apparatus)

Figure 7:
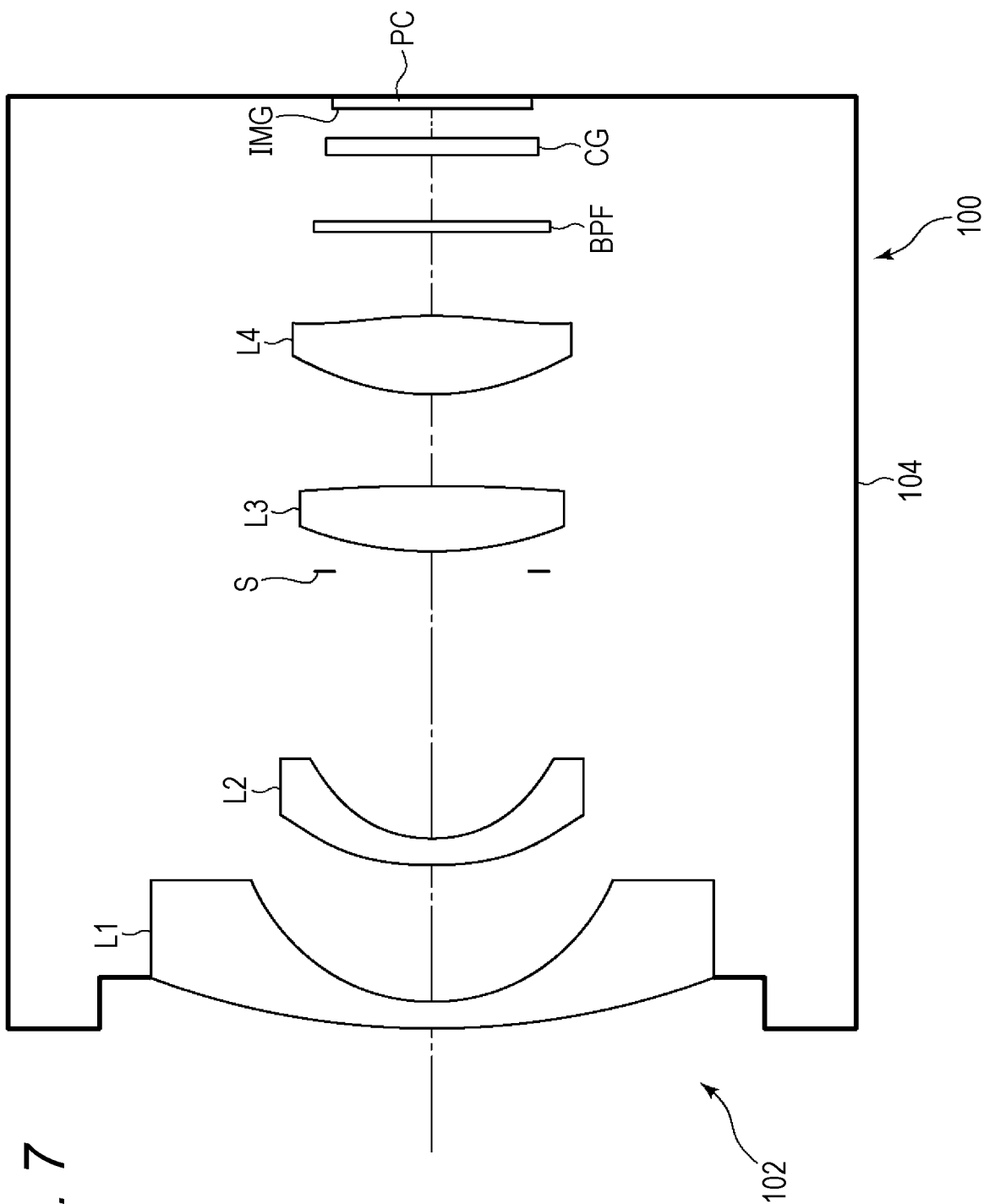
FIG. 7 is a configuration explanatory diagram of an imaging apparatus of an example of the present invention.

As illustrated in FIG. 7, an imaging apparatus 100 of an example includes an optical system 102 which is attached to an imaging apparatus housing 104. A photoelectric element PC is disposed on an imaging plane IMG of the optical system 102.

(Conditional Expression Corresponding Value)

| RESULT CALCULATED AT d-LINE | | | | |
|---|---|---|---|---|
| | CONDITIONAL EXPRESSION | EXAMPLE 1 | EXAMPLE 2 | EXAMPLE 3 |
| (1) | f/EXP | −0.14 | −0.16 | −0.13 |
| (2) | f1/f2 | 0.68 | 0.69 | 0.79 |
| (3) | f1/f | −3.94 | −3.90 | −3.68 |
| (4) | (R2L + R2R)/(R2L − R2R) | 2.16 | 2.53 | 1.67 |
| (5) | f4/f | 3.94 | 3.98 | 4.02 |
| (6) | (R1L + R1R)/(R1L − R1R) | 1.63 | 1.90 | 1.95 |
| (7) | f/R3L | 0.22 | 0.23 | 0.29 |
| (8) | f/R4L | 0.32 | 0.32 | 0.25 |
| | f | 2.41 | 2.38 | 2.41 |
| | EXP | −16.64 | −15.34 | −18.79 |
| | f1 | −9.51 | −9.29 | −8.87 |
| | f2 | −13.97 | −13.55 | −11.24 |
| | R2L | 12.45 | 10.38 | 17.5 |
| | R2R | 4.57 | 4.49 | 4.39 |
| | f4 | 9.50 | 9.48 | 9.68 |
| | R1L | 24.58 | 18.21 | 16.47 |
| | R1R | 5.91 | 5.66 | 5.29 |
| | R3L | 10.85 | 10.31 | 8.44 |
| | R4L | 7.62 | 7.48 | 9.47 |

(Conditional Expression Corresponding Value)

| RESULT CALCULATED AT 850 nm | | | | |
|---|---|---|---|---|
| | CONDITIONAL EXPRESSION | EXAMPLE 1 | EXAMPLE 2 | EXAMPLE 3 |
| (1) | f/EXP | −0.15 | −0.16 | −0.13 |
| (2) | f1/f2 | 0.68 | 0.68 | 0.79 |
| (3) | f1/f | −3.89 | −3.84 | −3.64 |
| (4) | (R2L + R2R)/(R2L − R2R) | 2.16 | 2.53 | 1.67 |
| (5) | f4/f | 3.87 | 3.89 | 3.95 |
| (6) | (R1L + R1R)/(R1L − R1R) | 1.63 | 1.90 | 1.95 |
| (7) | f/R3L | 0.23 | 0.24 | 0.29 |
| (8) | f/R4L | 0.33 | 0.33 | 0.26 |
| | f | 2.49 | 2.47 | 2.49 |
| | EXP | −16.53 | −15.26 | −18.61 |
| | f1 | −9.71 | −9.49 | −9.07 |
| | f2 | −14.18 | −13.94 | −11.42 |
| | R2L | 12.45 | 10.38 | 17.50 |
| | R2R | 4.57 | 4.49 | 4.39 |
| | f4 | 9.64 | 9.62 | 9.82 |
| | R1L | 24.58 | 18.21 | 16.47 |
| | R1R | 5.91 | 5.66 | 5.29 |
| | R3L | 10.85 | 10.31 | 8.44 |
| | R4L | 7.62 | 7.48 | 9.47 |

What is claimed is:

1. An optical system comprising:
   a first lens L1 having negative refractive power;
   a second lens L2 having negative refractive power;
   a third lens L3 having positive refractive power; and
   a fourth lens L4 having positive refractive power, the first lens L1, the second lens L2, the third lens L3, and the fourth lens L4 being disposed in this order from an object side, wherein
   the optical system satisfies a following condition:

$$-0.2 \leq f/EXP \tag{1}$$

where
   f is a focal length of the optical system, and
   EXP is a distance on an optical axis between an exit pupil and an imaging plane in the optical system when a direction from the object side to the imaging plane is defined as a positive direction, and
   wherein the optical system satisfies a following condition:

$$0.5 \leq f1/f2 \leq 1.5 \tag{2}$$

where
   f1 is a focal length of the first lens L1, and
   f2 is a focal length of the second lens L2.

2. The optical system according to claim 1, wherein the optical system satisfies a following conditional expression:

$$-10.0 \leq f1/f \leq -2.0 \tag{3}$$

where
   f1 is a focal length of the first lens L1.

3. The optical system according to claim 1, wherein the optical system satisfies a following conditional expression:

$$0.0 \leq (R2L+R2R)/(R2L-R2R) \leq 5.0 \tag{4}$$

where
   R2L is a paraxial radius of curvature of an object-side lens surface of the second lens L2, and
   R2R is a paraxial radius of curvature of an image-side lens surface of the second lens L2.

4. The optical system according to claim 1, wherein the optical system satisfies a following condition:

$$2.0 \leq f4/f \leq 6.0 \tag{5}$$

where
   f4 is a focal length of the fourth lens L4.

5. The optical system according to claim 1, wherein the optical system satisfies a following conditional expression:

$$1.1 \leq (R1L+R1R)/(R1L-R1R) \leq 4.0 \quad (6)$$

where
R1L is a radius of curvature of an object-side lens surface of the first lens L1, and
R1R is a radius of curvature of an image-side lens surface of the first lens L1.

6. The optical system according to claim 1, wherein the optical system satisfies a following conditional expression:

$$0.05 \leq f/R3L \leq 0.4 \quad (7)$$

where
R3L is a radius of curvature of an object-side lens surface of the third lens L3.

7. The optical system according to claim 1, wherein the optical system satisfies a following conditional expression:

$$0.03 \leq f/R4L \leq 0.5 \quad (8)$$

where
R4L is a radius of curvature of an object-side lens surface of the fourth lens L4.

8. The optical system according to claim 1, further comprising a stop disposed between the second lens L2 and the third lens L3.

9. The optical system according to claim 1, wherein at least one of the lenses is made of a resin material.

10. The optical system according to claim 1, further comprising a band-pass filter BPF configured to select and transmit light in a specific wavelength range.

11. An imaging apparatus comprising:
the optical system according to claim 1; and
an image sensor configured to convert an optical image formed by the optical system to an electric signal, the image sensor being disposed on the image side of the optical system.

* * * * *